Nov. 17, 1959   F. N. LORTIE   2,913,257
POSTING COLLATOR
Filed Aug. 19, 1957   4 Sheets-Sheet 1

INVENTOR.
FRANCIS N. LORTIE
BY
ATTORNEY

Fig. 5

Nov. 17, 1959     F. N. LORTIE     2,913,257
POSTING COLLATOR

Filed Aug. 19, 1957     4 Sheets-Sheet 3

INVENTOR.
FRANCIS N. LORTIE
BY
ATTORNEY

Nov. 17, 1959     F. N. LORTIE     2,913,257
POSTING COLLATOR
Filed Aug. 19, 1957     4 Sheets-Sheet 4

INVENTOR.
FRANCIS N. LORTIE
BY
ATTORNEY

United States Patent Office 2,913,257
Patented Nov. 17, 1959

2,913,257

POSTING COLLATOR

Francis N. Lortie, Oakland, Calif.

Application August 19, 1957, Serial No. 678,911

21 Claims. (Cl. 282—29)

This invention relates to an improved posting collator for use by bookkeepers and accountants.

Among the objects of the present invention is the provision of a collator adapted to many types of posting and capable of bringing about substantial savings in posting time and effort while, at the same time, enabling the use of low-priced standard forms instead of requiring special forms, of expensive specifications that are usually controlled by the supplier of the collating boards.

One of the difficulties with the prior art has been that form specifications have been given preference over the development of mechanical features necessary to bring about a saving in clerical time and a reduction in the cost of the special forms required. The primary purpose of the prior art therefore has been to provide simple and comparatively inexpensive collating boards that would promote the use of the special forms, which are usually unobtainable from any source other than the supplier of such collating devices. When several accounting applications have been included in one set-up, the various additional forms have been designed, without regard to complexity or uniformity of dimension, to conform with the limitations of the collating board, with the result that the advantages that would ordinarily accrue from the use of a collating device have been offset by the substantial increase in form-handling time and the increase in the cost of the forms required. Some manufacturers have held to the contention that collating boards should be simple and inexpensive and have been willing to sell them at cost, and others have permitted their customers to use these boards without charge, in order to provide a market for the particular forms that these collating devices required.

The present invention solves this problem by calling for only one out-of-the-ordinary specification for the forms; i.e., a particular punching arrangement, designed to relate to pegs on the collator. Any office stationer with proper punching equipment can provide this punching, and the forms, too, can be printed by any stationer; so they cost only a fraction of what the special forms required by former collators cost.

To obtain maximum efficiency in the use of form-collating devices, it is important that each unit be designed to perform most efficiently on the primary job on which it is to be applied. The writing of payroll records, as an illustration, calls for certain operations that do not apply to the posting of accounts receivable records. Therefore a device designed to produce the maximum efficiency and economy on a payroll writing operation would not produce the same relative results if applied to the posting of accounts receivable records. For that reason, on object of this invention is to provide a mechanical posting collator that brings about maximum efficiency and economy on those accounting applications wherein the volume job is that of posting to ledger records, such as accounts receivable, accounts payable, unit account distribution, stock records, and general ledger, and also increase the efficiency of operation in connection with the writing of payroll records and general account checks.

To clarify the nature of the new and novel features of this invention, a brief description will be given of the problems connected with the posting operation and the forms required when dealing with accounts receivable. Some of the prior art requires the use of a special statement form with a flap on the left side and a carbon sheet glued to the reverse side. This statement form, together with its corresponding ledger record, must be pre-collated by the posting clerk and held firmly in this position while they are placed in posting position on the collating board. This dual collation has been time consuming; the statements are expensive; and the month-end job of removing the carbon sheets and special flap before the statements are mailed is a bothersome and costly operation.

The present invention solves this problem by making it possible to use ordinary separate carbon paper which can be placed wherever desired. However, the already-attached type of carbon paper may be used whenever anyone wishes to.

In the prior art the journal sheet is held on the collator board in a fixed position; therefore, the writing line moves toward the bottom of the collating board as the posting progresses. Since that portion of the journal which is opposite the ledger and statement is covered with a sheet of carbon paper, it is necessary for the posting clerk to make an entry or a check mark on the journal to the right of the carbon sheet to indicate the last line on which a posting has been made. Failure to do this results in the succeeding posting being registered on the same journal line used for the prior posting. The correction of such errors is not only time-consuming but it has a substantial effect upon the value of this journal as a true record of posting made to the detail accounts.

An annoying and time consuming factor of prior-art types of collating board is the inability to remove the completed ledger and statement quickly and easily from the pegs without occasional damage to the forms. Since they lie flat upon the writing surface of the board, they cannot always be easily grasped. Other collating boards in prior art use a fixed-writing-line principle, but these require the posting clerk to constantly remember to space the journal sheet forward upon completing the posting to each account. Since this operation cannot be effectively checked until the next ledger and statement are placed in posting position on the collating board, frequently two entries are made on a single line of the journal, with the consequent time-consuming and bothersome corrections, and the reduction in the value of the journal as a true audit record.

The present invention solves this problem by providing a collator on which the posting and writing is always done on a particular line, which also has a novel shifting arrangement that practically insures that the proper line will be used when the posting is done.

Another object of this invention has been to provide mechanical features, certain of whose beneficial results are not obtainable on any other collating device currently on the market; these results are as follows—the elimination of errors resulting from superimposed entries on the journal sheet by providing a more automatic means of spacing the journal record forward on the completion of each account posting; the provision of a more efficient means for the rapid removal of completed forms without damage to such forms; the simplification of form specifications so that their costs may be reduced and month-end work in processing statements for mailing reduced or eliminated; the elimination of dual collation of ledger and statement forms required on most applications of other collators; the efficient handling of other accounting applications such as writing of payroll records and general account checks, utilizing standard inexpensive forms designed for the special payroll and check writing collators; the extension of the writing surface of the collating device by a supplementary table attached to the right of the main table, to effect an account distribution on a columnar sheet or on unit distribution accounts, as entries are made on the detail ledger accounts or as voucher general account checks are written.

The new and novel features of this invention come into effective use after the posting to ledger, statement and journal has been completed. From that moment on, the posting clerk is primarily concerned with the removal of the completed forms and proceeding with the next account posting with as little effort and delay as possible. To accomplish this the invention provides a means whereby, by the operation of a lever, the pegs over which the ledger and statement forms have previously been placed are retracted out of the forms and, as they return to normal position, they cause the ledger and statement to be raised from the writing surface of the collating device, so that they can be quickly grasped and removed. Simultaneously with the retraction of said pegs the journal sheet is spaced forward to the next open line of writing, this being accomplished without any additional thought or effort on the part of the posting clerk.

Since, in the operation of this lever, the posting clerk is primarily concerned with the retraction of the pegs and the raising of the forms so that they can be quickly removed, the simultaneous forward spacing of the journal sheet becomes, in reality, an automatic function; this journal spacing operation, being an integral part of removing the completed forms, becomes a positive function so that the possibility of two or more postings on the journal being superimposed, one over the other, is positively eliminated in the normal posting procedure.

The use of the fixed writing line enables the separate placement of ledger and statement on this writing line by associating the central of three pegs with this line and placing a punched hole at the selected line of posting on the forms on this peg as the forms are placed into position on the collating device. Carbon sheets on the front and back of the journal sheet cause entries made on the statement form to register on the journal and ledger record. There is no need to attach carbon to the statement and to provide a flap on this form for pre-collation purposes; in fact, to do so would tend to decrease the efficiency of the operation and would positively increase the cost by a substantial amount. These comparatively simple statement forms can be supplied by almost any printing firm equipped to punch the row of holes required for placement in posting position on the collator device.

In retail and wholesale establishments, accounts receivable posting as the primary job, volumewise, and other applications, such as payroll and accounts payable are secondary, though no less important. Another object of this invention is to provide features that will adapt the collator device to the writing of payroll records and general account checks, utilizing standard forms originally designed for other collator models. This eliminates the necessity of providing special forms that are quite expensive when purchased in small quantities. The invention provides a turnabout structure so that by simply reversing the normal posting position of the collator device and adding a holding attachment it is immediately converted for writing the payroll records, utilizing standard low cost forms. The addition of a special check holding attachment while the collator is in normal posting position adapts it for the writing of general account checks and the check disbursements journal.

Another object of this invention is to provide a means for making multi-column or unit-account distribution as the posting entries are made when the need for such arises. This is accomplished by providing an extension table which attaches on the right side of the main collator device, and placing thereon a columnar sheet to receive the distributive entries. Means are provided for the forward spacing of the columnar sheet in conformity with the forward movement of the journal on the main collator device.

Other objects and advantages of the invention will appear from the following description of a preferred form thereof, together with some indications of a few of its many uses.

In the drawings:

Fig. 6 is an enlarged fragmentary view in section, taken along the line 6—6 in Fig. 5.

Fig. 8 is a top plan view showing how the collator of this invention is used in an accounts-receivable posting operation with a sales/receipts journal, a ledger, and a statement on the main table, and a distribution journal on the extension table, with a coupler joining the two journals for movement together.

Fig. 9 is a view similar to Fig. 8, showing use of the invention with a purchase journal and ledger on the main table and a job-cost journal and job-cost ledger on the extension table, the journals being joined for movement together by a coupler.

Figure 10:
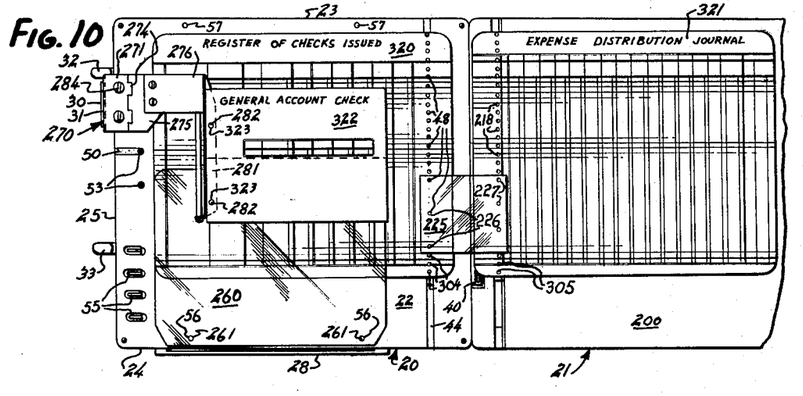
Fig. 10 is a view similar to Fig. 9 showing a "register of checks issued" and a "general accounts check" on the main table while an "expense distribution" journal is supported on the auxiliary table.
Figure 11:
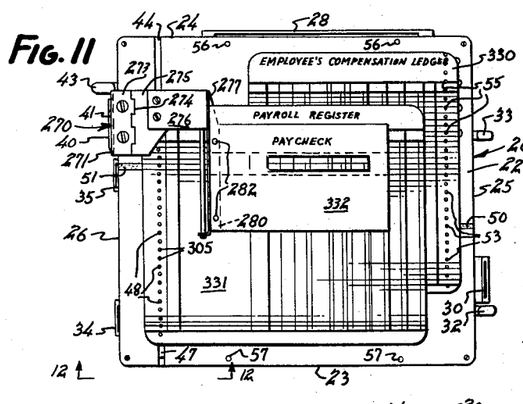
Fig. 11 is a top plan view of the main table in a turn-about or inverted position for use in payroll work, with a paycheck, payroll register, and employees compensation ledger supported thereon.
Figure 12:
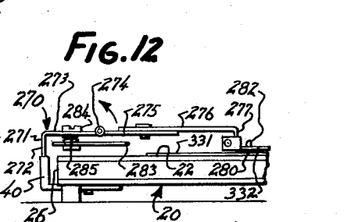
Fig. 12 is a view in elevation and in section taken along the line 12—12 in Fig. 11.

My new posting collator comprises, as shown in Figs. 1 through 4, a main collator unit 20 to which various attachments may be mounted, including the extension table 21 shown in Figs. 1–4, an arm rest 250 (see Fig. 9), a transparent shield 260 (see Fig. 10), and an auxiliary check-support member 270 (see Figs. 10, 11, and 12).

*The main collator 20 considered externally*

Figure 1:
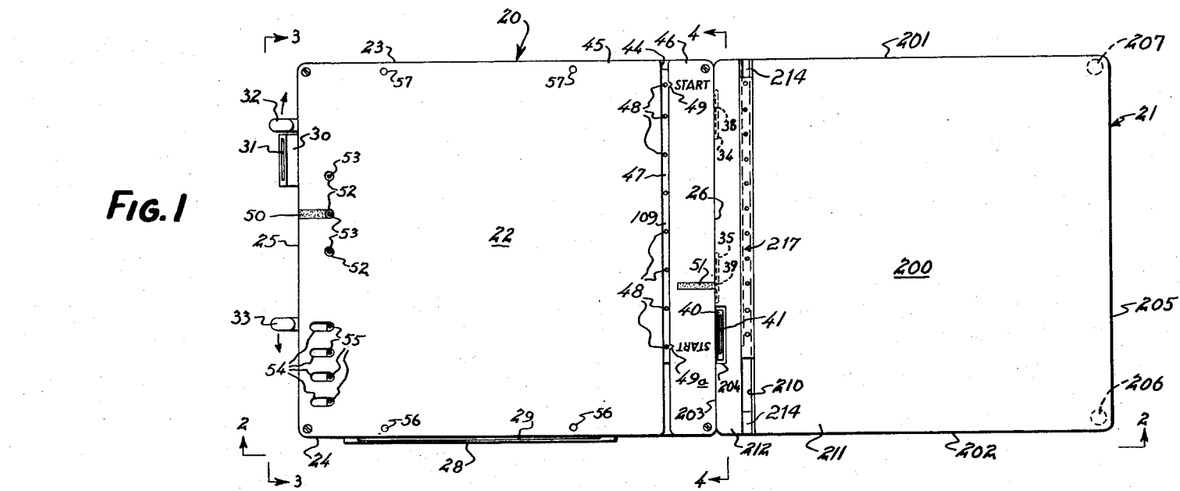
Fig. 1 is a top plan view of a collator incorporating the principles of my invention, with its extension table secured in place beside it and locked to it in proper alignment.
Figure 2:
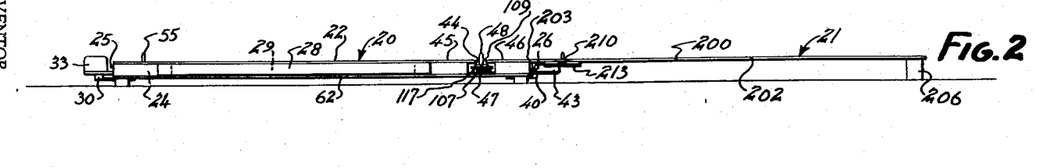
Fig. 2 is a front elevation view of the same, looking in the direction of the arrows 2—2 in Fig. 1.
Figure 3:
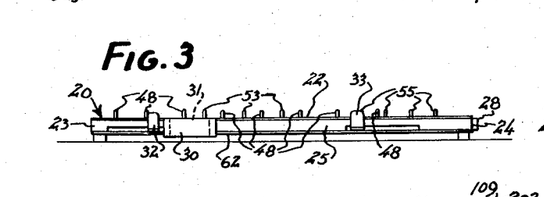
Fig. 3 is a side elevation view of the same, looking in the direction of the arrows 3—3 in Fig. 1.
Figure 4:
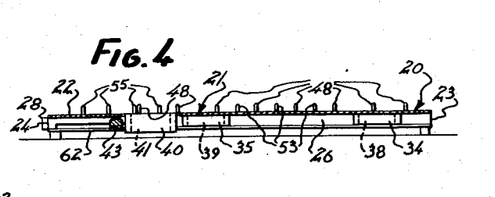
Fig. 4 is a view in elevation and in section taken along the line 4—4 in Fig. 1.

The main collator 20 may be about the size and thickness of a small drawing board; for example, it may be about 16" square and about ½" thick. The unit 20 provides a table surface 22 which, when oriented as shown in Fig. 1, is defined by a top edge 23, a bottom edge 24, a left-side edge 25, and a right-side edge 26.

Along the bottom edge 24 the frame 27 of the main unit 20 (see particularly Fig. 5) is provided with a bracket 28 providing a socket 29, the use of which will be explained later. (See Fig. 9.) Along the left-side edge a bracket 30 extends out from the frame 27 and provides a socket 31, whose use will also be explained later. (See Fig. 10.) The position of the bracket 30 may be adjusted somewhat by nuts 30ª and slots 30ᵇ. (See Fig. 5.) Also projecting beyond the side edge 25 are an upper lever handle 32 and a lower lever handle 33, mounted for movement up and down, as seen in Fig. 1; their exact use will be explained in a moment.

On the right-hand edge (see Fig. 5 for a clearer showing) project two brackets 34 and 35, provided with respective sockets 36 and 37. In these sockets 36 and 37 may be inserted respective tongues 38 and 39 of the extension table 21, when it is used. This, of course, makes it very easy to attach and detach the extension table 21, since it is held in alignment by the two sockets 36 and 37, and it may simply be lifted out or dropped into place.

A bracket 40 also projects out from the edge 26 and above the table 22 to provide it with a socket 41 whose use will be explained later. (See Figs. 11 and 12.) It may be noted now that the bracket 40 and socket 41 correspond to the bracket 30 and socket 31 and are symmetrically located with respect to them, for use when the table 22 is inverted from the position shown in Figs. 1-4 into the position shown in Figs. 11 and 13.

Also projecting from the right-hand edge 26 is a lever handle 43. As will be seen soon, this lever handle 43 accomplishes exactly the same thing as the lever handle 33 and is moved up and down, when in the position shown in Fig. 5, for purposes which soon will become evident.

Near the right-hand side edge 26, the table 22 is divided by a slot 44 which extends the full length of the tablet 22, into a wide table plate 45 on the left side and a narrow plate 46 on the right side of the slot 44. A carrier bar assembly 47 is mounted to move along the slot 44 in response to the movement of either lever handle 33 or 43. The carrier bar 47 has a series of spaced, upstanding pegs 48 projecting above the table surface 22, and these are adapted to engage perforations in the paper sheets used in the bookkeeping operations, as shown in Figs. 8-13. The arrangement (which will be subsequently explained) is that, by depressing either lever handle 33 or 43, the carrier bar 47 is moved up an amount corresponding to exactly one line on the paper. How this one-line-at-a-time movement is achieved will be explained in detail in the next section.

Near the top of the slot 44 the edge of the plate 46 is cut to provide a notch 49 opposite which the word "Start" or other code symbol may be placed to show that the upper peg 48 is to be positioned opposite the notch 49 when starting operation of the device, when used in its normal position (as in Figs. 8-10). Spaced above the bottom edge of the slot 44 is another notch 49ª in the plate 46, beside which the word "Start" or other appropriate code symbol is written in inverted letters. This is used when the table 22 is inverted, as for payroll posting, to align the then-top peg 48 with the notch 49ª (see Figs. 11-13). For related reasons, line indicators 50 on the left-hand side and 51 on the right-hand side may be provided. Preferably, these are colored marks; they may comprise a painted line on the table surface, or a piece of brilliant tape, or an inlay. Their exact use will be explained in the operation of the device, but it may be said now that their main purpose is to indicate the line on which the writing is done, depending upon the position of the apparatus.

Near the left-hand edge 25 on the upper half of the plate 45 are provided three circular openings 52, through which pegs 53 normally extend upwardly. Preferably, the line indicator 50 lies directly opposite the center peg 53 and center opening 52. The pegs 53 are adapted to be retracted down below the surface of the table 22 when either lower lever handle 33 or 43 is depressed, and then to automatically project up again when the depressed lever is released. They are unaffected by movement of the lever handle 32.

Along the lower half of the table 22, near the edge 25, are a plurality (preferably four) of elongated slots 54 through which pegs 55 may project. The pegs 55 are rotatable to a position down out of the way below the table surface 22 and they are moved to that position on the first time that either lever 33 or 43 is moved down; and they remain down until the upper lever 32 is moved up to snap them into their upper position. They then remain in the upper position until moved down again by either lever 33 or 43. Thus, each time either lever 33, 43 is moved down, the carrier bar assembly 47 is moved up one step and the pegs 52 are retracted below the surface of the table and then permitted to rise upon release of the lever. On the first time of any series of cycles when the lever handles 33 or 43 are moved, the pegs 55 are retracted below the surface and remain there.

The lever 32 acts to move the carrier bar assembly 47 downward one step at a time, and on its first action acts to snap the pegs 55 back up to the position where they project upwardly. As will be shown later, before the carrier bar assembly 47 can be moved up, its upper peg 48 must be adjacent or above the starting notch 49, and before the lever 32 can move the bar assembly 47 in the opposite direction, one of the pegs 48 must be at or below the notch 49ª. It may be explained at this point that generally the upper lever 32 will not be used when the table 22 is in the position shown in Fig. 1, but only when the table is inverted, so that the lever 32 will then be at the bottom right-hand side. (See Figs. 11 and 13.)

Along the lower edge 24 of the unit 20 are also perforations 56 which serve as sockets for a transparent shield or guard sheet 260 (see Fig. 10). There may be similar perforations 57 along the upper edge 23.

Figure 5:
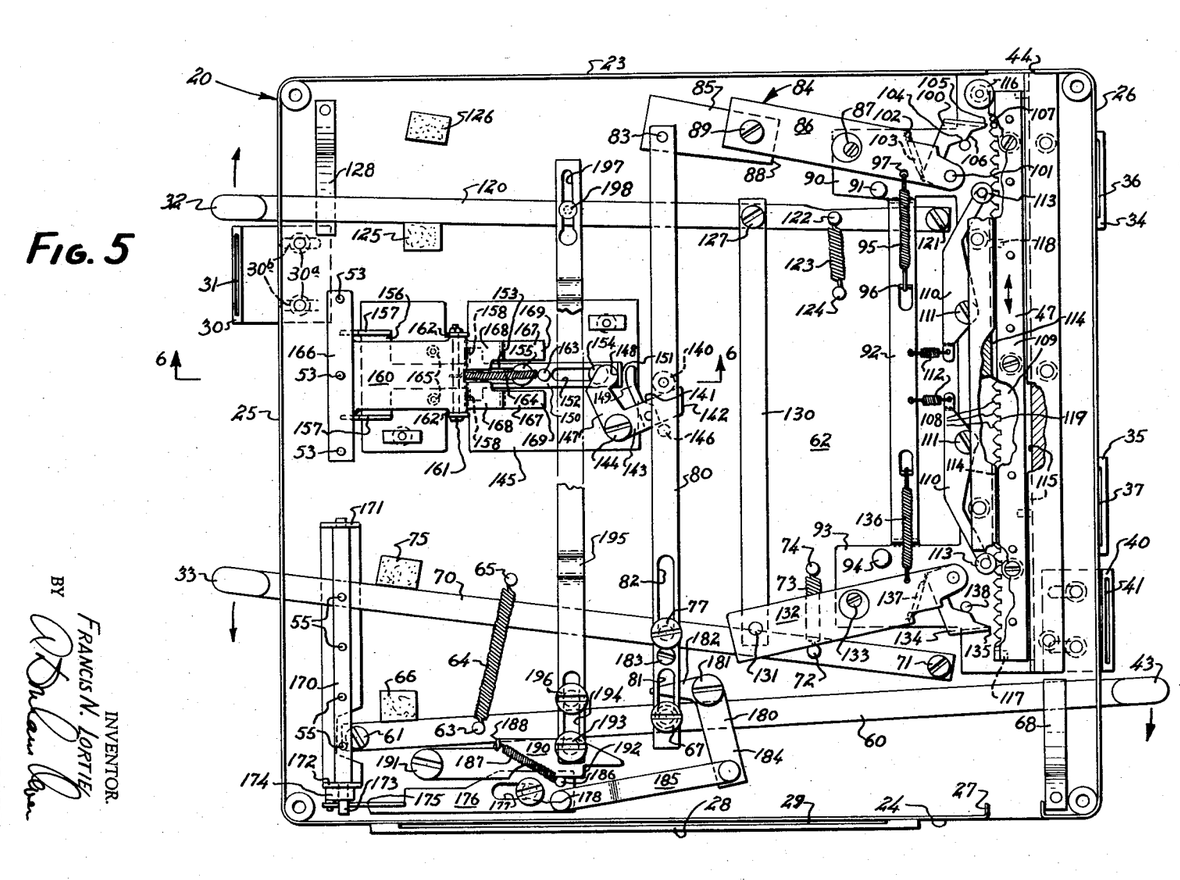
Fig. 5 is an enlarged top plan view of the main collator unit, with the cover plate removed to show the working mechanism thereunder. Some parts are cut away to show others more clearly.

The collator unit 20 considered internally (A) *Advancement of the bar 47 by the levers 32, 33, and 43.*—To understand how the levers 32, 33 and 43 operate, it will be necessary to consider Fig. 5, where the table plate 45 has been removed to show the mechanism therebeneath. While Fig. 5 is an enlarged view, its orientation is the same as Fig. 1; though the supplementary table 21 has been removed, since it plays no part in the basic operations.

The handle 43 forms one end of a lever 60, which is fulcrumed at its other end on a pivot 61, preferably secured to base plate 62 of the frame 27. The fulcrum pivot 61 thus lies near the left-hand edge 25. Between the fulcrum 61 and the handle 43, the lever 60 is provided with a button 63 to which is secured one end of a return spring 64, the other end of the spring 64 being attached to a button 65 that projects up from the base plate 62. The spring 64 acts to return the lever 60 automatically to its normally upper position upon release thereof. A rubber stop or bumper 66 may be provided adjacent the fulcrumed end of the lever 60 to cushion the return and to prevent undue movement. A capped button 67 is also provided on the lever, at a point lying between the return spring button 63 and the handle 43. The purpose of this button will be explained in a moment. A flat spring 68 adjacent the edge 26 overlies the lever 60 and holds it down at the proper level.

The handle 33 forms one end of a lever 70, which is mounted on a fulcrum 71 near the right-hand edge 26 and has a button 72 to which one end of a return spring 73 is anchored. The other end of the spring 73 is anchored to a button 74 that is secured to and extends up from the base plate 62. The lever 70 is held down by the fact that it lies beneath the spring 64. A rubber bumper or cushion or stop 75 may be provided at any convenient location and another capped button 77 is located between the handle 33 and the button 72 so that it lies due vertically above the button 67 on the lever 60. Thus a line connecting the buttons 67 and 77 will lie directly parallel to the side edges 25, 26.

The capped buttons 67, 77 help keep a straight bar 80 aligned by engaging its longitudinal slots 81, 82, respectively, so that the straight bar 80 moves parallel to the edges 25, 26 in an up-and-down direction whenever either lever 60 or 70 is moved by its handle 43 or 33. The caps for the buttons 67 and 77 may be suitable bolt members threaded thereinto.

The upper end of the straight bar 80 is attached by a pivotal connection 83 to a crank lever 84. The crank 84 may be constructed in two pieces, including an extension member 85 to which the actual attachment may be made, and a main portion 86 of the lever 84. The main crank portion 86 may be pivoted on a pin 87 so as to provide a first-class type of lever arrangement. The extension member 85 may have a guide flange 88 extending upwardly from it and may be rigidly attached by a bolt 89 to the main portion 86.

The pivot 87 may be formed as a part of a plate 90 which is rigidly secured to the base plate 62. The plate 90 may also have an upwardly projecting stud 91 to serve as a spacer for the table plate 45. To the plate 90 may be secured (or provided as an integral part thereof) a stationary bridge member 92 which extends parallel to the edge 26 and joins a plate member 93 substantially identical to and spaced symmetrically with respect to the plate 90. Thus it, also, has an upstanding spacer stud 94. The bridge member 92 acts substantially as a part of the frame 27 and base plate 62, except that it makes it possible to attach various spring members more easily. Thus, a return-spring 95 is secured to a projection 96 near the upper end of the bridge member 92 and the other end of the return spring 95 is secured to an opening 97 in the crank lever 84.

The outer end of the crank lever 84 (i.e., the end on the opposite side of the pivot 87 from the straight bar 80) may support a ratchet arm 100 by means of a pivot pin 101. A depending bent-down portion 102 on the crank lever 84 serves to anchor one end of a spring 103 whose other end is similarly anchored to the ratchet arm 100, as shown. A stud 104 projects up from the surface of the plate 90 and acts as a guiding stationary type of cam member. The ratchet arm 100 is provided with a ratchet tooth 105 and with a cammed face 106 which engages the stud 104.

The net result of all this structure is that when either handle 33 or 43 is moved, thereby moving the straight bar 80 and swinging the crank lever 84, the ratchet arm 100 is moved to the right by the pressure of its spring 103, the upward movement of the pivot 101, and the action of the camming stud 104. Thus the ratchet tooth 105 is projected forward into engagement with a tooth 108 of a ratchet or rack 107 which is secured to the bottom of and forms an integral part of the carrier bar assembly 47. Further movement of the lever 60 or 70 then acts, by further upward swinging of the pivot end 101 of the crank lever 84, to carry the ratchet tooth 105 upwardly and to project the rack 107 upwardly, along with its attached carrier bar assembly 47 and the pegs 48. Thus, the bar pegs 48 are moved up one step, corresponding to one line of the accounting form. When the depressed lever handle 33 or 43 is released, its return spring 64 or 73 snaps it back into place, and the return spring 95 retracts the ratchet tooth or detent 105 from the rack 107, leaving the carrier bar assembly 47 in its advanced position one step up from where it was before.

The paper carrying bar assembly 47 may thus comprise several members, including the ratchet 107 (whose teeth 108 are spaced to give the correct spacing on the paper when the bar assembly 47 is moved), and a bar 109 on which the pegs 48 are mounted. To insure that the movement will not go beyond the one-step-at-a-time movement, no matter how much force is applied to the lever handle 33 or 43, a brake means is provided. Preferably, there are two identical brake members comprising, in each instance, a lever crank 110 mounted rotatably on a pivot 111 which projects up from the base plate 62. One end of each brake lever crank 110 is fastened to one end of a spring 112, whose other end is anchored to the bridge member 92. The end of the lever crank 110 on the opposite side of the pivot 111 from the spring 112 is bent in to a position near the rack 107 and supports a roller 113 of suitable bearing material. The rollers 113 thus follow the rack 107, and the brake lever 110 swings to permit passage of the rack 107, but the springs 112 normally urge the roller 113 snugly against the rack 107 and therefore act as a brake to prevent advancement of the rack beyond the single step to which the mechanical connections of the levers 60 and 70 force the rack.

The rack 107 rides in a pair of guideways 114, 115, and a guide wheel 116 may be provided near the end of the slot 44 to aid in keeping its path straight. Stops 117 and 118 below the guideway 114 prevent the rack 107 from moving all the way out of the slot 44. Preferably, the teeth 108 each extend at 45°, converging toward each other, and the rack 107 is provided with a small rectangular notch 119 at the base of each tooth 108, so that the ratchet detent 105 will have positive engagement to insure positive forward spacing, pushing transversely against the rack 107 at that notch 119 rather than at the angle of the teeth 108.

It will be appreciated from the drawing that the carrier bar assembly 47 will not be moved up unless its uppermost ratchet teeth 108 can be engaged by the detent or ratchet tooth 105. That is, at least one tooth 108 of the rack 107 must be engageable by the ratchet tooth 105. As will be seen also from the drawings, a ratchet tooth 108 is in a position to be engaged only when that peg 48 which is uppermost on the bar 47 is opposite or above the notch 49. This shows why it is important to obtain that alignment before operating the machine. However, the bar assembly 47 can be slid to the proper position, and the brake means assures alignment of the teeth 108 and 105.

The carrier bar assembly 47 can be moved in the opposite direction (downwardly) by movement of the handle 32 upwardly, followed by its release. The mechanism for accomplishing this action includes a lever 120 whose fulcrum 121 lies at the opposite end from the handle 32, near the slot 44. The lever 120 is provided with a button 122 to which one end of a return spring 123 is anchored, the other end being anchored to an upstanding button 124 secured to the base frame 62. Bumpers or rubber stops 125, 126 may be provided to limit movement of the lever 120, and a spring 128 may be provided to hold the lever 120 away from the base plate 62. The lever 120 is connected by a pivot pin 127 to a straight bar 130. The other end of the straight bar 130 is connected by a pivot pin 131 to a crank lever 132 substantially identical to the crank lever 86. In fact, the purpose of the extension member 85 is to make it possible for the members 86 and 132 to be identical, the extension 85 providing the additional length needed for the member 84. The crank lever 132 is pivoted at 133 and pivoted to it at its opposite end is a ratchet arm 134 with a ratchet tooth or detent 135. The connection and return springs are exactly the same as for the crank lever 86 and ratchet arm 100. Thus, the return spring 136 for the crank lever 132 is anchored to the bridge member 92, and a spring 137 for the ratchet 134 is anchored to the crank lever 132. A cammed stud 138 like the stand 104 is also provided and the configuration of the ratchet tooth is the same.

Thus, it will be obvious that upward movement of the handle 32 moves the lever 120 and straight bar 130 up and swings the crank lever 132 about its pivot 133, therefore projecting the ratchet tooth 135 into engagement with a tooth 108 of the rack 107, thereby projecting the rack 107 one step in the downward direction as shown in Fig. 5. (As stated before, when the lever handle 32 is used, the unit 20 is normally turned around so that this would actually mean upward movement.) The return springs 123 and 136 restore the lever 120 and crank 132 to their original positions. It will again be apparent from the drawing why at least the foremost stud 48 should be opposite the start notch 49a before using the handle 32, so that the ratchet tooth 135 will be sure to engage a tooth 108 of the rack 107.

(B) *Retraction of the pegs 53* (Figs. 5 and 6).—The foregoing description shows how the carrier bar assembly 47 and its pegs 48 are moved one step at a time by the lever handles 32, 33 and 43. However, this is not all that the levers do. The next thing to be considered is how the levers 60 and 70 act to retract the pegs 53 each time either handle 33 or 43 is moved down.

A roller 140 is secured rotatably to the under surface of the straight bar 80 about midway between its ends. This roller 140 is adapted to engage and follow an edge 141 of one arm 142 of a crank 143, which is mounted to swing on a pivot 144 secured to a stationary plate 145, which is itself secured rigidly to the base plate 62. To insure return of the crank 143 upon release of the levers 60 and 70, a return stud 146 may be secured to the lower surface of the straight arm 80 on the opposite side of the crank arm 142 from the roller 140.

The other arm 147 of the crank 143 is provided with a rounded edge 148, while a second arm 149 may be rigidly secured to the arm 142, parallel to the arm 147 and spaced from it. The rounded edge 148 engages one side (the left side, in Fig. 5) of an upstanding end flange 151 of a sliding bar 150, to move the bar 150 to the right whenever lever 60 or 70 is depressed. The arm 149 may engage the right-hand side of the flange 151 to assure return of the bar 150 upon release of the lever 60 or 70. The bar 150 may be guided to move parallel to the top and bottom edges 23 and 24 by a pair of elongated guide slots 152, 153 that engage headed studs 154, 155 projecting up from the plate 145. Secured to the other end of the sliding bar 150, that is, the end closer to the side edge 25, is a guide member 156 with a pair of upstanding flanges 157 spaced from each other and extending generally parallel to the top and bottom edges 23 and 24. The bar 150 also has a pair of flange-like cams 158 which extend up from the bar 150 on either side thereof adjacent the left end of the slot 153.

Above the sliding bar 150 and generally parallel to it is a swinging pivoted member 160 which is pivotally mounted for seesaw movement on a shaft 161. The shaft 161 lies parallel to the edge 25 and is supported by a pair of brackets 162 which may be bent up from the plate 145. The sliding bar 150 is provided with an upstanding button 163 to which one end of a return spring 164 is secured. The other end of the return spring 164 is secured to the shaft 161. On the left-hand side of the shaft 161 a pair of return compression springs 165 are provided between the plate 145 and the swinging member 160. The springs 165 are so adjusted that when the left side of the swinging member 160 is depressed, the springs 165 are compressed and therefore tend to urge that side of the swinging member 160 back up when that becomes possible.

The three pegs 53 are mounted atop a strip 166 which is secured to or forms the outboard end of the swinging member 160—that is, the end closest to the edge 25. It will be noted that the edges of the swinging member 160 lie between the two guide flanges 157, which act to prevent displacement of the pegs 53 from their holes 52. On the right-hand side of the pivot shaft 161, the swinging member 160 is forked to provide a pair of arms 167 which slope down over a portion 168 to a generally flat portion 169 that normally lies in engagement with the plate 145, because of the force exerted by the two springs 165. When the member 160 lies in this normal position, the pegs 53 project out through the openings 52 and above the level of the table surface 22.

However, when either lever 60 or 70 is depressed, the crank 143 is rotated clockwise with respect to the position shown in Fig. 5, and its rounded end 148 engages the flange 151 of the sliding bar 150 and moves it to the right. Then the cams 158 engage the undersurface of the sloping portion 168 of the swinging member 160 and force them up, thereby depressing the strip 166 and raising the ends 169. This retracts the pegs 53 below the level of the table 22. The return springs 164 and 165 (with the aid of the stud 146 and arm 149, if necessary) act to return the bar 150 and member 160 to their normal position upon release of the lever handle 33 or 43, again projecting the pegs 53. Thus, every time the lever handle 33 or 43 is moved down, the pegs 53 will be retracted below the table 22, and when the handle 33 or 43 is released the pegs 53 will again project up above the table 22. The flanges 157 extend beneath the strip 166 and prevent the pegs 53 from being depressed manually when perforated forms are installed over them.

(C) *Retraction and projection of the pegs 55* (Fig. 5).—It now remains to explain the operation by which the pegs 55 are rotated to bring them below the level of the table 22 and the operation by which they are again projected up through the oblong openings 54.

The pegs 55 are mounted on a rotatable shaft 170 which is journaled in upstanding brackets 171 and 172 which, in turn, are secured to the base frame 62. A portion 173 of the shaft 170 projects beyond the lower bracket 172, and to it a crank pin 174 is rigidly secured in an eccentric position. A crank 175 is pivotally secured to the crank pin 174 and so is eccentric with respect to the shaft 170. The crank 175 is either rigidly secured to or formed as an integral part of a sliding bar 176 which is guided parallel to the edge 24 by its slot 177 engaging a capped projection 178 that extends out from the base 62.

A crank 180 is mounted pivotally on a pin 181 which is secured to the base 62, preferably adjacent the lever 60. One arm 182 of the crank 180 extends beneath the straight bar 80 for engagement by a stud 183 that is secured to the lower surface of the straight bar 80, when either lever 60 or 70 is depressed and if the pegs 55 are then projecting upwardly. The other arm 184 of the crank 180 is pivotally secured to a link 185 which, in turn, is pivotally secured to the sliding bar 176 adjacent its end. This means that if the pegs 55 are projecting upwardly at the time either crank handle 33 or 43 is moved down, the movement of the lever 60 or 70 will carry the sliding bar 80 down, and its projecting stud 183 will engage the crank arm 182, thereby rotating the crank arm 180 and pulling the link 185 and bar 176. Movement of the bar 176 will rotate the shaft 170, thereby turning the pegs 55 down below the level of the table 22.

The sliding bar 176 is provided with an upstanding post 186 which serves a dual function. For one thing, it anchors one end of a spring 187, the other end of which is secured to a bracket 188 on a lever 190. One end of the lever 190 is pivoted at a fulcrum pin 191 which projects up from the base 62, and its other end is provided with a rectangular cut-out portion defining a locking edge 192.

Thus, when the crank 180 is rotated by the stud 183 so as to rotate the shaft 170, this action moves the sliding bar 176 along until the post 186 passes to the right of the locking edge 192. Then the pulling force of the spring 187 swings the lever 190 toward the edge 24. This means that when the post 186 passes the locking edge 192, the lever 190 moves into a latching position where the locking edge 192 is behind the post 186. As a result of this action, the shaft 170 is held in its rotated (pegs 55 down) position by the bar 176 and latch 186, 192.

The lever 190 is provided with a capped stud 193 which engages one end of a slot 194 in a straight bar 195 which lies parallel to the straight bar 80. The same slot 194 is elongated sufficiently to engage a projecting capped guide member 196 which projects up from the base 62 and helps keep the straight bar 195 in proper alignment. The opposite end of the straight bar 195 is provided with a slot 197 which engages a capped projection 198 on the lever 120. This means that if the pegs 55 have been rotated down to a position below the level of the table 22 by virtue of either lever 33 or 43 having been depressed, they can be restored and rotated back by upward movement of the handle 32. The restoration acts in this manner: the lifting of the handle 32 raises the lever 120 and its projection 198 engages the end of the slot 197 and pulls the straight bar 195 upwardly. The bar 195, guided by the projection 196, pulls on the stud 193 and swings the latch 190 away from the edge 24. When the latch 190 is swung far enough to release the locking post 186 from the locking edge 192, the spring 187 sharply snaps the bar 176 to the left. This force is transmitted, via the crank arm 175 to the shaft 170, rotating it to its position where the pegs 55 are vertical instead of horizontal. Due to the snap action, the studs 55 remain in their fixed vertical position until either lever arm 33 or 43 is moved to rotate them to their horizontal positions.

*Brief summary of the mechanical operation of the main collator unit 20 (Fig. 5)*

Depressing either handle 33 or 43 swings its lever 70 or 60 about its fulcrum 71 or 61 and pulls the straight bar 80 toward the edge 24. This swings the crank lever 84 around its pivot 87 and projects the ratchet arm 100 so that its detent 105 first engages a tooth 108 of the rack 107 and then moves the rack 107 and the carrier bar assembly 47 one step up toward the edge 23. The brakes 110 prevent excessive movement. At the same time, the movement of the straight bar 80 toward the edge 24 causes the stud 140 to swing the crank 143, thereby pulling the sliding bar 150 toward the edge 26. The cams 158 on the bar 150 then engage the sloping forks 151 of the swinging member 160, raising the forks 167 and depressing the strip 166, so that the pegs 53 are retracted below the table 22. Also at the same time (if, and only if the pegs 55 are then projecting above the table 22), movement of the straight bar 80 toward the edge 24 causes the stud 183 to engage the arm 182 of the crank 180 and swing the crank 180 counterclockwise, as seen in Fig. 5. When the crank 180 swings, it pulls the link 188 and the bar 176 toward the edge 26 and thereby rotates the shaft 170 (by virtue of the eccentric connection of the crank 175), rotating the pegs 55 to the left where they are retracted. The post 186 passes beyond the locking edge 192 and the spring 187 locks the latch lever 190 against the post 186, holding the pegs 55 locked in their retracted position.

When the depressed handle 33 or 43 is released, its lever 70 or 60 is restored to its original position by its return spring 73 or 64, and the straight bar 80 is released. The return spring 95 acting on the crank 84 and the return spring 164 acting on the sliding bar 150 both act to move the straight bar 80 toward the edge 23 while also acting to restore the crank 84 and its ratchet tooth 105, and the sliding bar 150 permits the spring 165 to force the forked ends 167 down and the strip 166 up, projecting the pegs 53 up above the table. The pegs 55 remain unaffected, because of the locking of the latch 186, 192.

When the handle 32 is moved up toward the edge 23, the lever 120 swings up on its fulcrum 121, pulling the straight bar 130 up and swinging the crank 132, thereby projecting the ratchet tooth 135 into the rack 107 and moving the carrier bar assembly 47 one step down toward the edge 24. At the same time (if, and only if the pegs 55 are in their retracted position), the lever 120 moves the straight bar 195 up toward the edge 23, swinging the lever 190 up, releasing the post 186 from the locking edge 192. The spring 187 then pulls the bar 176 to the left, rotating the crank pin 174 and shaft 170 to project the pegs 55 above the table 22.

Upon release of the handle 32, the return spring 123 swings the lever 120 and straight bars 130 and 195 down, while the return spring 136 restores the crank 132 and ratchet impeller tooth 135 to their original positions. The lever 190 and bar 176 remain unaffected; so the pegs 55 remain projected above the table 22.

*The extension or supplementary table 21 (Figs. 1, 2, 4 and 7)*

Figure 7:
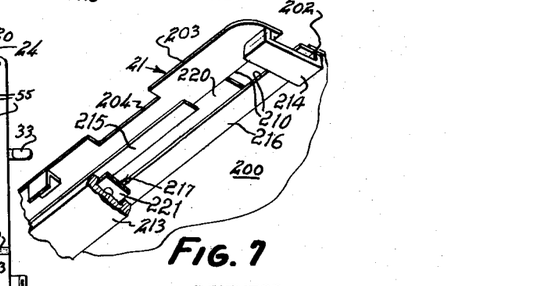
Fig. 7 is a view in perspective from below of the extension table.

For convenience, the supplementary unit 21 is substantially the same size as the unit 20. Its table surface 200 is level with the surface 22, when installed. Its upper edge 201 is then collinear with the edge 23, while its lower edge 202 is collinear with the edge 24. The tongues 38, 39 that engage in the sockets 36, 37 to link the unit 21 to the unit 20 are located near an edge 203, which is provided with a cutout portion 204 to avoid the bracket 40. Beneath the other edge 205, preferably near the corners, are supporting feet 206, 207.

The table surface 200 is split by a slot 210 that divides it into a large work plate 211 on the right side of the slot 210 and a smaller plate 212 on the left side. The plates 211 and 212 are joined together by plates 213, 214 that are spaced below the level of the table surface 200. Between the plates 211, 212 and the plates 213, 214 are strips 215, 216 (Fig. 7) providing ways for a carrier bar assembly 217 with pegs 218 that match the bar assembly 47 and pegs 48. There is no rack 107 in the assembly 217, but a pair of strips 220 and 221 lie one above and one below the ways 215 and 216 and are secured together in between the ways.

To obtain simultaneous parallel movement of the carrier bar assemblies 217 and 47, a linking member 225 (Figs. 8–10) may be provided, having openings 226 that engage some pegs 48 and openings 227 that engage corresponding pegs 218 (see Figs. 9 and 10). The linking member 225 may be flat, since it will operate above the bracket 40, or it may be bridged.

Thus, when the supplemental table 21 is in place with its tongues 38, 39 in the sockets 36, 37, and when the linking member 225 is installed, actuation of the lever 33 will move the carrier bar assemblies 47 and 217 synchronously. (The lever 43 is then concealed by the table 200, and the lever 32 is not normally used in this connection.)

*Other accessories (Figs. 9–12)*

Among the useful accessories are an arm rest 250 (Fig. 9), comprising a metal member with a flat surface 251 that overlies the work papers up to a short distance below the work line 50. It has a lengthwise extending tongue 252 extending into the socket 29 provided by the bracket 28. It prevents smudging of the clean paper and blurring of the carbons, etc., which tend to occur when the paper is left unprotected.

To prevent unwanted transference of impressions from carbon or sensitized paper, a transparent shield 260 (Fig. 10) may be used therebeneath. The shield 260 preferably has pins 261 that engage in the openings 56 (or 57) to hold the shield 260 in place.

Another, generally more important, convenience is given by a check holding device 270 (Figs. 10–12). The check holder 270 is adapted to align a check with the proper accounting columns and to be swung out of the way when writing the payee's name on the check register. It comprises a fixed bracket 271 whose vertical tongue 272 can be engaged in either of sockets 31 or 41. A horizontal portion 273 of the bracket 271 is provided with a hinge 274 for mounting a swingable bracket 275, which has a horizontal portion 276 and a vertical portion 277. To the vertical portion is secured an L-shaped bracket 280, whose normally horizontal portion 281 is provided with a pair of studs 282. These engage perforations in the checks and support it in place. When the check has been written and removed, the bracket 275 and all the parts it supports can be swung about 180° on the hinge 274, where these parts will be out of the way. A stop member 283 is mounted yieldably below the hinge 274 by bolts 284 secured to the bracket 271 and spring 285.

How the collator is used (Figs. 8–12)

The collator is capable of a wide variety of uses. Purely as examples, some uses are shown, though they are by no means exhaustive. They will, however, serve to indicate its capabilities and utility.

Use of the collator in posting accounts receivable

Fig. 8 shows a set-up for handling accounts receivable. A statement form 300, a ledger 301, and a sales/receipts journal 302 are all to be filled out simultaneously over the table 22, while a distribution journal 303 is carried along with the sales/receipts on journal 302 over the table 200. In order to do this, the link or coupler device 225 is used.

The sales/receipts journal 302 is installed, with its perforations 304 engaged by the pegs 48, and the distribution journal 303 is installed with its perforations 305 engaged by the pegs 218. The coupler 225 is then placed over some of both sets of pegs 48 and 218 so that the two carrier bar assemblies 47 and 217 will then move together. This means that one can continue to write on the same line on both journals 302 and 303. The statement 300, ledger 301, and journal 303 forms on the left-hand side are preferably printed so that their columns and lines align properly, but this does not lead to any additional expense, since that is the way such forms are normally printed. A sheet of free carbon paper (obscured in the drawings) is interleaved between the statement 300 and the ledger 301 and another carbon sheet (also obscured) is interleaved between the ledger 301 and the journal 302.

At the start of operations, the two journals 302 and 303 are installed in parallel position on the pegs 48 and 218 so that the next writing line on each lies opposite the writing line indicator 50 on the upper left-hand side of the table 22. The coupler 225 is then installed. Next, a sheet of ordinary carbon paper is placed over the journal 302 and the ledger 301 is placed over the pegs 53, its next writing line also lying opposite the writing line indicator 50. Then another sheet of carbon paper may be placed over the ledger form 301, and the statement form 300 installed on the pegs 53 so that its writing line is also opposite the indicator 50. The entry is then written on the statement 300. It will carry through the carbon paper and print on the ledger 301 and on the journal 302. Then the proper entry is made on the distribution journal 303, writing on the same line. It will be noted that the ledger 301 and statement 300 do not obscure the other half of the journal 302, so that makes it easier also to keep the necessary alignment and gives free space for the additional entries there.

When the entires are made, the lever handle 33 at the lower left-hand side of the unit 20 is depressed. This moves the two journals 302 and 303 up one writing line and prepares them for the next entry. Simultaneously, the pegs 53 are retracted and then, when the handle 33 is released, come back up. Due to friction, the ledger 301 and statement 300 will move up somewhat but not a complete line; so the pegs 53 will not realign with them and enter their perforations when they come back. Thus it now becomes very easy to remove the statement 300 and ledger 301, whereas before it was difficult to strip them off the pegs. The purpose of this is to insure that the bookkeeper will operate the lever 33 each time and thereby always advance the journals 302 and 303 up one line. By making this the easy way to take off the statement 300 and ledger 301, the bookkeeper always takes them off that way and so always advances the journals 302 and 303 after each entry. This insures against making one entry in the journal over another.

In place of interleaved carbon paper, the forms may be printed on sensitized paper for direct transfer of impressions.

Purchase and job-cost journals and ledgers

Referring now to Fig. 9, it will be seen that a purchase journal 310 and job-cost journal 311 are installed over the pegs 48 and 218 exactly as were the journals 302 and 303 in Fig. 8. In addition, a job-cost ledger 312 is positioned over the job-cost journal 311 with carbon paper between them. This means the two postings are done simultaneously. The coupler 225 is installed as before. A ledger 313 is then inserted over the pegs 53 in proper alignment with the writing line indicator 50, the journals 310 and 311 having previously been so aligned. For illustration, the arm rest 250 is also shown installed. The accountant then makes the entries and, in order to remove the ledger 313, depresses the lever 33. This not only releases the ledger 313, but advances the journals 310 and 311 and the job-cost ledger 312 one step, so that the accountant is ready for his next entry when he wants the next ledger in alignment with the writing line 50. For many uses, the job-cost ledger 312 may be placed on the pegs 218 above the coupler 225 instead of below it.

General account disbursements and posting

In Fig. 10 a "register of checks issued" 320 is installed over the pegs 48 as was the journal 302, and an expense distribution ledger 321 is installed over the pegs 218, and the coupler 225 put in place as before. In this instance, a general account check 322 is to be written and entered simultaneously on the register 320. Therefore, the check writer 270 is installed, and the check's perforations 323 are placed over the studs 282. The check 322 is thus automatically aligned with the proper writing line 50. When the check has been written, the register of checks issued reflects the proper information, impressed on it by the carbon paper. When the check has been written, also, the bracket 275 is swung over on the hinges 274 while removing the check, and then when that has been done the lever handle 33 is depressed to move the register 320 and ledger 321 up one step, assuring that the register will be at the proper line for the next check. Before writing the next check, the payee's name is written on the register 320, and then the check holder 270 is swung back to the checkwriting position and the check inserted.

Collator in turnabout use: Payroll work (Fig. 11)

The device is also characterized by a turnabout feature. In this case, only the main unit 20 is used, and it is turned about 180°. The pegs 55, which in all the uses heretofore discussed have been in their retracted position, are now put into the upright position by moving the lever 32 down (the lever 32 now being in the lower right-hand corner). An employees' compensation ledger 330 is installed on the pegs 55 and 53. A payroll register 331 is mounted on the main pegs 48, while the pay check 332 itself is mounted on the checkholder 270, which is now engaged in the socket 41. Entries are then made substantially as before, except that by depressing the handle 32 the payroll register 331 is moved up a line at a time on each operation.

Often, several—sometimes as many as twenty—ledgers 330 are stacked on the collator at one time in this manner. Such use is enabled by the flexible nature of the hinge 274, permitting relative movement of the brackets 271 and 280.

Figure 13:
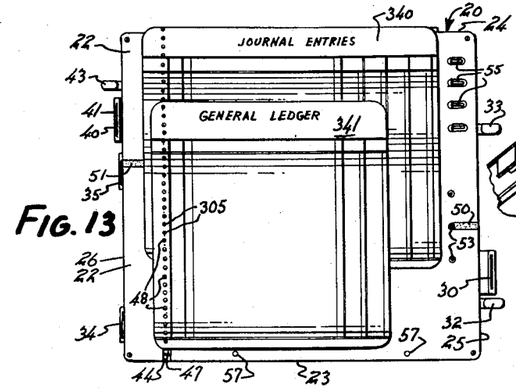
Fig. 13 is a view similar to Fig. 11, showing the device used with a journal and a general ledger.

Turnabout use: journal and general ledger (Fig. 13)

Another use of collator 20 in its turnabout position is shown in Fig. 13, where journal entries and general ledger are made in this manner. The pins 55 may be down in this instance and both the journal 340 and the general ledger 341 may be supported upon the same pins 48 each time, by moving the device up one step, so the same writing line 50 can be used and there is no need to be writing at an awkward position. The general ledger and journal entries are aligned at the beginning, and when used in this manner there is no disengagement as there was before, because the general ledger is mounted on the pegs on the sliding member. Each time the material is shifted up one line, however, in order to maintain the same writing line. This means that the accountant or bookkeeper never has to write in a cramped, uncomfortable space.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A posting collator, comprising a rectangular table having a slot adjacent and parallel to one side edge, a carrier bar assembly mounted in said slot for movement therealong and having pegs projecting upwardly therefrom, a plurality of second pegs on the opposite side of said table, normally projecting thereabove but retractable therebelow, and lever means for moving said carrier bar assembly up one step at a time while simultaneously retracting said second pegs below said table.

2. The collator of claim 1 having means for returning said second pegs above said table upon release of said lever means.

3. The collator of claim 1 in which there are three of said second pegs and in which said table is provided with a writing-line indicator opposite the center peg.

4. A posting collator, comprising a rectangular table having a slot adjacent and parallel to one side edge, a carrier bar assembly mounted in said slot for movement therealong and having pegs projecting upwardly therefrom, a plurality of second pegs on the opposite side of said table, normally projecting thereabove but retractable therebelow, and a pair of levers each operatively connected beneath said table for moving said carrier bar assembly up one step at a time while simultaneously retracting said second pegs below said table, a handle portion of one lever projecting from each side of said table.

5. A turnabout posting collator, comprising a rectangular table member having its upper surface divided into a major portion and a minor portion by a slot, a carrier bar assembly mounted in said slot for movement therealong and having pegs projecting upwardly therefrom, first lever means for moving said carrier bar assembly up one step at a time, and second lever means for moving said carrier bar assembly down one step at a time.

6. A turnabout posting collator, comprising a rectangular table having a slot adjacent and parallel to one side edge, a carrier bar assembly mounted in said slot for movement therealong and having pegs projecting upwardly therefrom, a plurality of second pegs on the opposite side of said table, movable from a position projecting thereabove to a position where they are retracted therebelow, first lever means for moving said carrier bar assembly up one step at a time while simultaneously retractng said second pegs below said table and holding them there after release of said first lever means, and second lever means for moving said carrier bar assembly down one step at a time while simultaneously projecting said second pegs above said table and holding them there after release of said second lever means.

7. A posting collator comprising a frame; a table surface supported on said frame and split by a slot adjacent and parallel to one edge and having a plurality of peg openings parallel to said slot near the opposite edge; a carrier bar assembly mounted for longitudinal movement along said slot and having a rack on one edge below said table and a plurality of upwardly projecting paper aligning pegs on its upper surface; lever means fulcrumed beneath said table and having handle means extending out beyond said table; rack-moving means operatively connected to said lever means and engageable with said rack upon movement of said lever means, for one-step-at-a-time movement of said rack; cam means mounted for sliding movement in a direction transverse to said rack and operatively connected to said lever means; and peg supporting means supported adjacent said cam means and having a plurality of pegs projecting up and normally extending through said peg openings but retracted therethrough when said cam means is moved by said lever means.

8. The collator of claim 7 having an auxiliary table detachably secured to said frame level with said table surface along the edge closer to and parallel to said slot and having its own slot and pegged, rackless carrier bar close to the adjoining edges, and linking means comprising a member having two parallel rows of openings each adapted to engage pegs of one carrier bar and carry the carrier bar of said auxiliary table along with the carrier bar having the rack when said lever means is moved.

9. The collator of claim 7 wherein the rack has teeth extending at about 45° and converging, with a rectangular notch cut into the base of each pair of teeth.

10. A posting collator comprising a frame; a table surface supported on said frame and split by a slot adjacent and parallel to one edge and having a plurality of peg openings parallel to said slot near the opposite edge; a carrier bar assembly mounted for longitudinal movement along said slot and having a rack on one edge below said table and a plurality of upwardly projecting paper aligning pegs on its upper surface; lever means fulcrumed beneath said table and having handle means extending out beyond said table; rack-moving means operatively connected to said lever means and engageable with said rack only upon movement of said lever means, for one-step-at-a-time movement of said rack; return means for said rack-moving means and said lever means; a bar mounted for sliding movement transverse to said rack and operatively connected to said lever means; said bar having cam means on its upper surface; a pivotally supported member adjacent said bar in engagement with said cam means and having a plurality of pegs projecting up and normally extending through said peg openings but retracted therethrough by movement of said lever means acting on said cam means; and return springs for both said sliding bar and said swinging member.

11. A posting collator comprising a frame; a table surface supported on said frame and split by a slot adjacent and parallel to one edge and having a plurality of peg openings parallel to said slot near the opposite edge; a carrier bar assembly mounted for longitudinal movement along said slot and having a rack on one edge below said table and a plurality of upwardly projecting paper aligning pegs on its upper surface; lever means fulcrumed beneath said table and having handle means extending out beyond said table; a crank operatively connected at one end to said lever means and having at its other end means for engagement with said rack upon movement of said lever means, for one-step-at-a-time movement of said rack; a sliding bar mounted for movement relative to said frame transverse to said rack and opertively connected to said lever means, said bar having cam means on its upper surface; and a swinging member pivotally supported adjacent said bar in engagement with said cam means and having a plurality of pegs projecting up and normally extending through said peg openings but retracted therethrough when said swinging member is swung by movement of said lever means.

12. A posting collator comprising a frame; a table surface supported on said frame and split by a slot adjacent and parallel to one edge and having a plurality of peg openings parallel to said slot near the opposite edge; a carrier bar assembly mounted for longitudinal movement along said slot and having a rack on one edge below said table and a plurality of upwardly projecting paper aligning pegs on its upper surface; lever means fulcrumed to said frame beneath said table and having handle means extending out beyond said table; a crank pivoted to said frame and operatively connected at one end to said lever means and having a ratchet member pivoted to its other end for engagement with said rack upon movement of said lever means, for one-step-at-a-time movement of said rack; return means for said crank and said lever means; a sliding bar mounted for movement relative to said frame transverse to said rack and operatively connected to said lever means, said bar having cam means on its upper surface; a swinging member pivotally supported adjacent said bar in engagement with said cam means and having a plurality of pegs projecting up and normally extending through said peg openings but retracted therethrough when said swinging member is swung by movement of said lever means; and return springs for both said sliding bar and said swinging member.

13. A posting collator comprising a frame; a table surface supported on said frame and split by a slot adjacent and parallel to one edge and having a plurality of peg openings parallel to said slot near the opposite edge; a carrier bar assembly mounted for longitudinal movement along said slot and having a rack on one edge below said table and a plurality of upwardly projecting paper aligning pegs on its upper surface; first and second lever means each fulcrumed to said frame beneath said table and having handle means extending out beyond said table; first and second rack-moving means respectively operatively connected to said first and second lever means and respectively engageable with said rack upon movement of their said lever means, for one-step-at-a-time movement of said rack in opposite directions; a rotatable shaft journaled below said table and having a plurality of second pegs thereupon adapted upon rotation of said shaft to project above said table at one position of said shaft and to be returned therebelow at another position; a sliding bar mounted for movement relative to said frame transverse to said rack and connected to said shaft by an eccentric crank; means connecting said bar to said first lever means for retracting said second pegs upon movement of said first lever means; latch means to hold said second pegs retracted after release of said first lever means; and means connected to said second lever means for releasing said latch means and rotating said second pegs to their projecting position.

14. A posting collator comprising a frame; a table surface supported on said frame and having top, bottom, and side edges, said surface being split by a slot adjacent one side edge and having near its opposite side edge a series of openings parallel to said slot, said surface also having a line indicator near each side edge parallel to said top edge; a carrier bar assembly mounted in frame-supported guideways for longitudinal movement along said slot and having a rack on one edge below said table and a plurality of paper aligning pegs projecting up from its upper surface; first and second levers separately fulcrumed to said frame beneath said table and having handles extending out beyond the opposite side edges of said table; a straight bar operatively connected to both said levers for movement parallel to the side edges of the table when either lever handle is moved toward said bottom edge; a first crank pivoted to said frame and pivotally connected at one end to said straight bar and having a ratchet member pivoted to its other end for engagement with said rack upon movement of either said lever, for one-step-at-a-time movement of said rack in one direction; brake means for limiting the movement of said rack; return springs for said crank and said first and second levers; a second crank swung by said straight bar; a sliding bar mounted for movement parallel to said top edge and moved by said second crank when one of said first and second levers is moved, said bar having cam means on its upper surface; a swinging member pivotally supported adjacent said bar in engagement with said cam means, and having a plurality of pegs projecting up, from the opposite side of its pivot from said cam means and normally extending through one said series of openings in said table surface but retracted therethrough when said swinging member is swung by movement of either of said first and second levers acting through said straight bar; and return springs for both said sliding bar and said swinging member.

15. A posting collator comprising a frame; a table surface supported on said frame and having top, bottom, and side edges, said surface being split by a slot adjacent one side edge and having near its opposite side edge a series of openings parallel to said slot, said surface also having a line indicator near each side edge parallel to said top edge; a carrier bar assembly mounted in frame-supported guideways for longitudinal movement along said slot and having a rack on one edge below said table and a plurality of paper aligning pegs projecting up from its upper surface; first and second levers separately fulcrumed to said frame beneath said table and having handles extending out beyond side edges of said table; a straight bar operatively connected to said first lever for movement parallel to the side edges of the table when the handle of said first lever is moved toward said bottom edge; a first crank pivoted to said frame and pivotally connected at one end to said straight bar and having a ratchet member pivoted to its other end for engagement with said rack upon movement of said first lever, for one-step-at-a-time movement of said rack in one direction; brake means for limiting the movement of said rack; return springs for said crank and said first lever; a second crank like said first crank and operatively connected to said second lever for moving said rack one step at a time in the opposite direction to that to which said rack is moved by said first lever; a shaft rotatably mounted to said frame beneath said series of openings and having pegs thereon that are projecting through or withdrawn through said other openings by rotation of said shaft; a third crank pivotally mounted on said frame and engaged by said straight bar for movement about its pivot, said third crank being operatively connected eccentrically to said shaft; latching means for holding said shaft pegs in withdrawn position; and means actuated by said second lever for releasing said latch and rotating said shaft pegs to project through their openings.

16. A posting collator comprising a frame; a table surface supported on said frame and having top, bottom, and side edges, said surface being split by a slot adjacent one side edge and having near its opposite side edge two series of openings parallel to said slot, said surface also having a line indicator near each side edge parallel to said top edge; a carrier bar assembly mounted in frame-supported guideways for longitudinal movement along said slot and having a rack on one edge below said table and a plurality of paper aligning pegs projecting up from its upper surface; first and second levers separately fulcrumed to said frame beneath said table and having handles extending out beyond the opposite side edges of said table; a straight bar operatively connected to both said levers for movement parallel to the side edges of the table when either lever handle is moved toward said bottom edge; a first crank pivoted to said frame and pivotally connected at one end to said straight bar and having a ratchet member pivoted to its other end for engagement with said rack upon movement of either said lever, for one-step-at-a-time movement of said rack in one direction; brake means for limiting the movement of said rack; return springs for said crank and said first and second levers; a third lever fulcrumed to said frame and having a handle extending beyond one side edge of said table; a second crank like said first crank and operatively connected to said third lever for moving said rack one step at a time in the opposite direction to that to which said rack is moved by said first and second levers;

a third crank swung by said straight bar; a sliding bar mounted for movement parallel to said top edge and moved by said third crank when one of said first and second levers is moved, said bar having cam means on its upper surface; a swinging member pivotally supported adjacent said bar in engagement with said cam means; and having a plurality of pegs projecting up, from the opposite side of its pivot from said cam means and normally extending through one said series of openings in said table surface but retracted therethrough when said swinging member is swung by movement of either of said first and second levers acting through said straight bar; return springs for both said sliding bar and said swinging member; a shaft rotatably mounted to said frame beneath the other said series of openings and having pegs thereon that are projecting through or withdrawn through said other openings by rotation of said shaft; a fourth crank pivotally mounted on said frame and engaged by said straight bar for movement about its pivot, said fourth crank being operatively connected eccentrically to said shaft; latching means for holding said shaft pegs in withdrawn position; and means actuated by said third lever for releasing said latch and rotating said shaft pegs to project through their openings.

17. A posting collator comprising a frame; a table surface supported on said frame and having top, bottom, right side and left side edges, said surface being split by a slot adjacent the right side edge and having on an upper portion near its left side edge a plurality of openings along a line parallel to said left side edge and on a lower portion near its left side edge a similar line of oblong widthwise openings, said surface also having a line indicator near each side edge parallel to said top edge; a carrier bar assembly mounted in frame-supported guideways for longitudinal movement along said slot and having a rack on its left edge below said table and a plurality of upwardly projecting paper aligning pegs on its upper surface; first and second levers separately fulcrumed to said frame beneath said table and having handles extending out beyond the opposite side edges of said table; a straight bar operatively connected to both said levers for movement parallel to the side edges of the table when either lever handle is moved toward said bottom edge; a first crank pivoted to said frame and pivotally connected at one end to said straight bar and having a ratchet member pivoted to its other end for engagement with said rack upon movement of either said lever, for one-step-at-a-time upward movement of said rack; brake means for said rack limiting the movement thereof; return springs for said crank and said first and second levers, secured to said frame; a third lever fulcrumed to said frame and having a handle extending beyond said left side edge; a second crank like said first crank and operatively connected to said third lever for moving said rack downward one step at a time; a third crank engaged by said straight bar for movement about a pivot; a sliding bar mounted for movement relative to said frame parallel to said top edge and moved by said third crank away from said left side edge when one of said first and second levers is moved, said bar having cam means on its upper surface; a swinging member pivotally supported adjacent said bar in engagement with said cam means; return springs for both said sliding bar and said swinging member; a plurality of pegs projecting up from said swinging member on the opposite side of its pivot from said cam means and normally extending through the openings in the upper left portion of said table surface but retracted therethrough when said swinging member is swung by movement of either of said first and second levers acting through said straight bar; a shaft rotatably mounted to said frame beneath said oblong openings and having pegs thereon that are projected through or withdrawn through said oblong openings; a fourth crank pivotally mounted on said frame and engaged by said straight bar for movement about its pivot, said fourth crank being operatively connected eccentrically to said shaft for rotating it to withdraw its said pegs; latching means holding said shaft pegs withdrawn; spring means urging said pegs to their projected position and means actuated by said third lever for releasing said latch, upon movement of said third lever.

18. A posting collator, comprising a rectangular table member having its upper surface divided into a major portion and a minor portion by a slot, a carrier bar assembly mounted in said slot for movement therealong and having pegs projecting upwardly therefrom, lever means operatively connected to said carrier bar assembly beneath said table and projecting out from said table, for moving said carrier bar assembly up one step at a time, a socket adjoining the edge parallel to said slot, and a check supporter provided with a stationary L-shaped bracket with a vertical leg fitting in said socket and a horizontal leg and a swingable L-shaped bracket hinged to said horizontal leg and having a depending portion with a horizontal flange adapted to rest on said table and having check-supporting and aligning pegs thereon.

19. A posting collator, comprising a first rectangular table member having its upper surface divided into a major portion and a minor portion by a slot, a first carrier bar assembly mounted in said slot for movement therealong and having pegs projecting upwardly therefrom, lever means operatively connected by a step-at-a-time ratchet to said first carrier bar assembly beneath said table and projecting out from said table, for moving said first carrier bar assembly up one step at a time, a second rectangular table member also divided by a slot into a major portion and a minor portion, means for detachably connecting said second table member to said first table member with the two minor portions adjoining each other, a second carrier bar assembly in the slot of said second table member with pegs projecting upwardly therefrom and a linking member comprising a sheet above said boards having two rows of peg-receiving openings detachably fitting over the pegs of both said bar assemblies to link them together for step-at-a-time movement upon operation of said first bar assembly by said lever through the said ratchet.

20. A posting collator for use with spaced journal forms, comprising a frame; a table supported on said frame and divided by a slot; a carrier bar assembly mounted for longitudinal movement along said slot and having a rack below said table and a plurality of upwardly projecting paper-aligning pegs on its upper surface above said table; lever means fulcrumed beneath said table and having handle means extending out beyond said table; and ratchet spacer means operatively connected to said lever means and normally out of engagement with said rack so that said carrier bar assembly may be moved freely along said slot, and engaged with said rack when and only when said lever means is actuated, for moving said carrier bar assembly a distance equal to a space of said journal form, said ratchet spacer means having a detent to force and hold said rack to a precise position regardless of the speed with which said lever means is moved.

21. The collator of claim 20 wherein said rack has beveled teeth with a rectangular notch between successive teeth and wherein said detent is shaped to substantially fill said notch when it is engaged in said rack.

References Cited in the file of this patent

UNITED STATES PATENTS

| | | |
|---|---|---|
| 2,011,625 | Gerety | Aug. 20, 1935 |
| 2,494,142 | Pfeiffer et al. | Jan. 10, 1950 |
| 2,696,393 | Fitzgerald | Dec. 7, 1954 |